US011853582B2

(12) United States Patent
Yoshii et al.

(10) Patent No.: US 11,853,582 B2
(45) Date of Patent: Dec. 26, 2023

(54) STORAGE SYSTEM (71) Applicant: Hitachi, Ltd., Tokyo (JP)

(72) Inventors: Yoshihiro Yoshii, Tokyo (JP); Masahiro Tsuruya, Tokyo (JP); Ryosuke Tatsumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/944,071

(22) Filed: Sep. 13, 2022

(65) Prior Publication Data

US 2023/0315323 A1 Oct. 5, 2023

(30) Foreign Application Priority Data

Mar. 31, 2022 (JP) .................................. 2022-060184

(51) Int. Cl.
*G06F 3/06* (2006.01)

(52) U.S. Cl.
CPC ............ *G06F 3/0647* (2013.01); *G06F 3/064* (2013.01); *G06F 3/0604* (2013.01); *G06F 3/0679* (2013.01)

(58) Field of Classification Search
CPC ..... G06F 3/0647; G06F 3/0604; G06F 3/0679
USPC .......................................................... 711/154
See application file for complete search history.

(56) References Cited

U.S. PATENT DOCUMENTS

2009/0100242 A1\* 4/2009 Lin .................... G06F 12/02
711/E12.002
2017/0357589 A1 12/2017 Izawa et al.

FOREIGN PATENT DOCUMENTS

WO 2016/203629 A1 12/2016

\* cited by examiner

*Primary Examiner* — Jae U Yu
(74) *Attorney, Agent, or Firm* — Procopio, Cory, Hargreaves & Savitch LLP (57) ABSTRACT

A first node receives a read request, determines a storage drive location where data corresponding to one or more logical addresses designated in the read request is stored, and requests transfer of the data at the one or more logical addresses, from the second node, when the storage drive location is the second node. The second node reads a data chunk containing the data designated by the one or more logical addresses, from one or more storage drives, determines whether to decompress the data chunk based on the size of the data chunk and the size of the one or more logical addresses, decompresses the data chunk based on the determination as to decompress the data chunk, extracts data at the one or more logical addresses, and transfers the extracted data to the first node.

7 Claims, 8 Drawing Sheets

DRIVE MANAGEMENT TABLE 211

| DRIVE NUMBER 401 | CAPACITY 402 | STATUS 403 | CONNECTION CTL NUMBER 404 |
|---|---|---|---|
| 0 | 1000GB | NORMAL | 0 |
| 1 | 1000GB | NORMAL | 1 |
| : | | | |
| X | 2000GB | MALFUNCTIONING | 0 |
| : | | | |

FIG. 6

LOGICAL-PHYSICAL MANAGEMENT TABLE (312)

| LOGICAL ADDRESS | DRIVE NUMBER | PHYSICAL ADDRESS | COMPRESSED DATA SIZE | OFFSET |
|---|---|---|---|---|
| 0x00000000 | 0 | 0x00001000 | 16KB | 0KB |
| 0x00000004 | 0 | 0x00001000 | 16KB | 4KB |
| 0x00000008 | 0 | 0x00001014 | 20KB | 0KB |
| 0x0000000c | 0 | 0x00001010 | NOT COMPRESSED | - |
| ⋮ | | | | |
| 0x00001000 | 0 | 0x00001000 | 16KB | 8KB |
| 0x00001004 | 0 | 0x00001000 | 16KB | 12KB |
| ⋮ | | | | |

STORAGE SYSTEM

CLAIM OF PRIORITY

The present application claims priority from Japanese patent application JP 2022-060184 filed on Mar. 31, 2022, the content of which is hereby incorporated by reference into this application.

BACKGROUND OF THE INVENTION

1. Field of the Invention

The present invention relates to a storage system.

2. Description of the Related Art

In response to a demand for reductions in IT investment costs, there has been an increasing need for a scale-out storage that can achieve a cost reduction in the initial investment by starting out small, and that can be expanded flexibly as the workload increases. A possible approach for implementing a highly scalable storage system is an approach of building a larger storage system by combining a plurality of nodes. In this type of storage system, by adding a node, performance of the storage system can be expanded in accordance with the workload. For example, U.S. 2017/0357589 A discloses a system including a plurality of storage devices.

Furthermore, in a storage system, a data compression technology has also been attracting attention, as an important technology for reducing a cost per unit capacity (bit cost) of the system. In particular, in recent years, instead of a hard disk drive (HDD) having been conventionally used as a storage device, a semiconductor drive (solid state drive (SSD)) that uses a flash memory excelling in high speed as a medium has come to be widely used. A data compression technology has been attracting attention as a technology for reducing a bit cost of a storage system including an SSD.

SUMMARY OF THE INVENTION

In a storage system in which data storages are distributed across a plurality of nodes, decompression processing is performed on the node where the host is connected, in order to reduce a network load. Data are compressed by a small unit, e.g., 8 KB. In order to improve the compression ratio, it is effective to increase the size of this unit of compression. However, if the size of the unit of compression in increased, in the amount of internal transferred data may become increased and the throughput may deteriorate. Therefore, there has been a demand for a technique that achieves not only a storage cost reduction with a high compression ratio, but also a high throughput performance.

One aspect of the present invention is a storage system including a plurality of nodes. The plurality of nodes include a first node and a second node. The first node receives a read request, determines the location of a storage drive storing therein data corresponding to one or more logical addresses designated in the read request, and, when the storage drive is located in the second node, requests transfer of the data at the one or more logical addresses, from the second node. The second node reads a data chunk including the data designated by the one or more logical addresses from one or more storage drives, determines whether the data chunk requires decompression based on the size of the data chunk and the size of the one or more logical addresses, decompresses the data chunk based on a determination that the data chunk is to be decompressed, extracts data at the one or more logical addresses, and transfers the extracted data to the first node.

According to an embodiment of the present invention, it is possible to achieve not only a storage cost reduction with a high compression ratio but also a high throughput performance. Problems, configurations, and advantageous effects other than those explained above will be clarified by the following description of the embodiments.

DESCRIPTION OF THE PREFERRED EMBODIMENTS

An embodiment of the present invention will now be explained with reference to some drawings. Note that, in the following descriptions, various types of information may be explained in an expression such as a "management table", but these various types of information may be expressed with a data structure other than a table. In addition, it is possible to make a reference to the "management table" as "management information" to indicate that the information is not data-structure dependent.

In addition, processing may be explained using a "computer program" as a subject. A computer program is executed by one or more processors, such as one or more central processing units (CPUs), and is caused to execute predetermined processing. Note that, because the processing is executed using a storage resource (e.g., a memory) and a communication interface device (e.g., a communication port) as appropriate, a processor may be used as the subject of the processing. The processor may include dedicated hardware, as well as the CPU. The computer program may be installed to each computer from a computer-program source. The program source may be provided as a computer-program distribution server or storage medium, for example.

Furthermore, although each element may be identified using a number or the like, but it is also possible to use other types of identification information, such as a name, as long as the information is capable of identifying. In the drawings and the descriptions of the present invention, the same parts are denoted by the same reference numerals, but the present invention is not limited to this embodiment, and all application examples conforming to the idea of the present invention fall within the technical scope of the present invention. In addition, each component may be provided in a plurality or singularity, unless specified otherwise.

A storage system and data transfer in the storage system according to an embodiment of the present specification will now be explained. A storage system according to an embodiment of the present specification is a scale-out storage system including a plurality of nodes, and has a function for reducing the amount of data. When it is necessary to read data from a node that is different from the node having received an I/O request, the node where the data is being stored determines whether it is required to decompress compressed data, based on a predetermined condition.

In an embodiment of the present specification, when the size of the data after compression is larger than the I/O length having been requested, the node storing therein the data decompresses the data, and transfers the requested range from the decompressed data, to the receiving node having requested the I/O. If not, the compressed data is transferred from the node storing therein the data to the receiving node having requested the I/O, and the receiving node having requested the I/O decompresses the data. In the above configuration, it is possible to achieve a reduction in the storage cost as well as an improved throughput performance with a high compression ratio, by which the throughput performance is improved, while avoiding a bottleneck in the internal transfer bandwidth.

Figure 1:
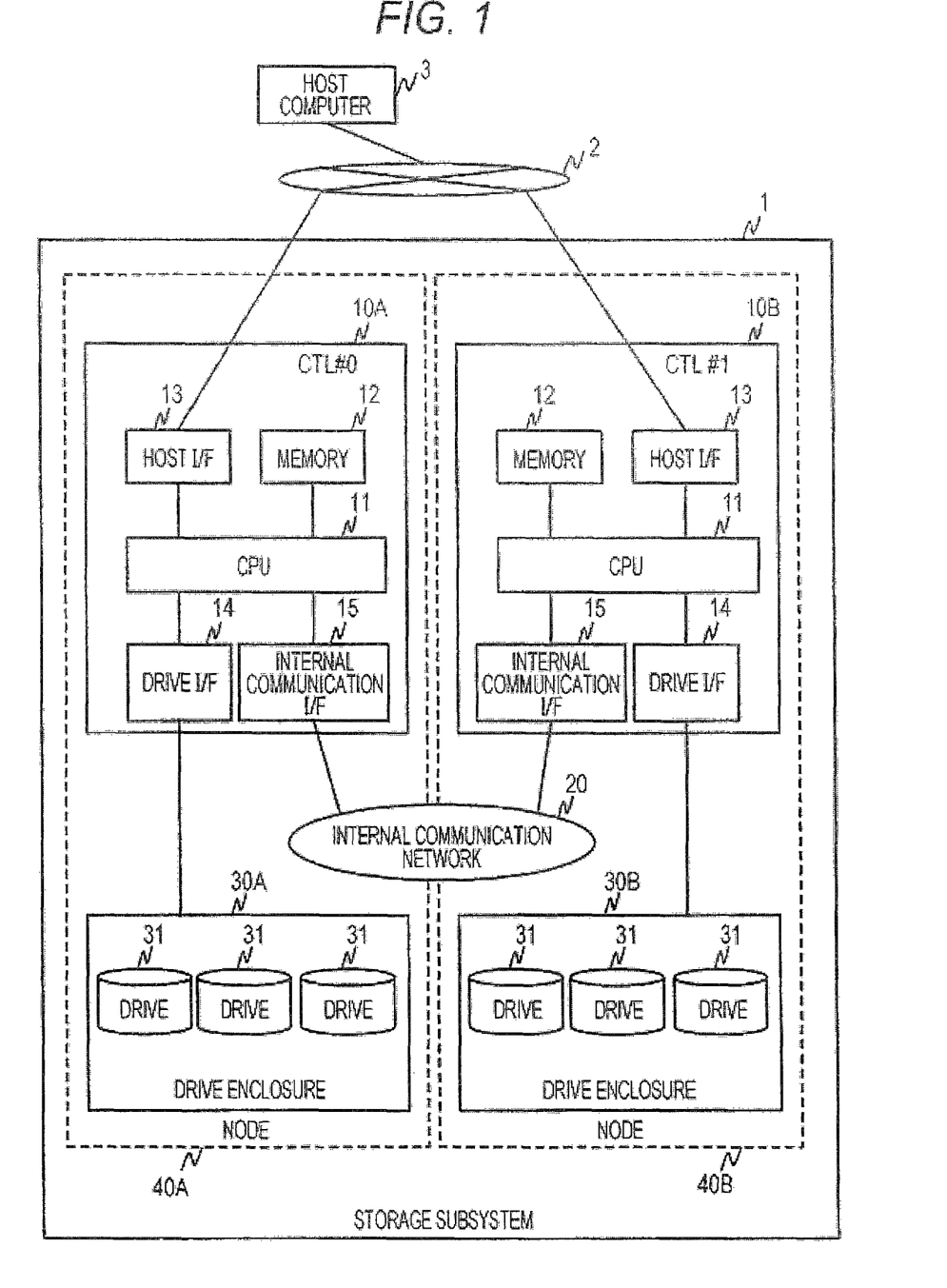
FIG. 1 is a diagram illustrating a configuration example of a computer system including a storage subsystem.

FIG. 1 illustrates an example of a configuration of a computer system. The computer system includes a storage subsystem 1 and a host computer 3 connected to the storage subsystem 1. The storage subsystem 1 is connected to a storage area network 2 connecting the host computer 3 and the storage subsystem 1 to each other over Fibre Channel (FC), Ethernet, or the like, and exchanges data with the host computer 3. Although one host computer 3 is illustrated in FIG. 1 as an example, any number of host computers may communicate with the storage subsystem 1.

The storage subsystem 1 includes a plurality of nodes. In FIG. 1, two nodes 40A, 40B are illustrated as an example. Each of the nodes alone can make up a storage device. The host computer 3 can access both of the nodes 40A and 40B. The number of nodes in the storage subsystem 1 may be any number, and, by adding a node, it is possible to enhance the performance of the storage subsystem in accordance with the workload.

The node 40A includes a controller (CTL) 10A and a drive enclosure 30A. The node 40A may also include a plurality of controllers and a plurality of drive enclosures. The node 40B includes a controller 10B and a drive enclosure 30B. The node 40B may also include a plurality of controllers and a plurality of drive enclosures.

In the description below, a controller 10 means any one of the controllers, and a drive enclosure 30 means any one of the drive enclosures. Furthermore, a node 40 means any one of the nodes.

Each of the drive enclosures 30A, 30B includes one or more storage drives (also simply referred to as a drive) 31. The drive 31 is a physical storage device on which a nonvolatile medium is mounted, and may be a hard disk drive (HDD) or a solid state drive (SSD), for example. In each of the drive enclosures, a plurality of drives 31 may form a redundant array of independent disks (RAID) group.

In the configuration example illustrated in FIG. 1, the controller 10 is connected to the drive enclosure 30 on the same node, and is allowed to read and to write data directly, without any intermediation of another controller. Specifically, the drive enclosure 30A is connected to and directly accessed by the controller 10A. The drive enclosure 30B is connected to and directly accessed by the controller 10B.

The controllers 10A and 10B are not directly connected to the drive 31 on another node. To access a drive 31 on another node, the controllers 10A and 10B make an access indirectly, with an intermediation of another controller on the node to which the drive 31 to be accessed belongs. For example, to access the drive 31 on the node 40B, the controller 10A requests the transfer of data from the controller 10B.

In the configuration example illustrated in FIG. 1, the controller 10A and the controller 10B have the same hardware configurations. The configuration will now be explained using the controller 10A as an example. The controller 10A includes a CPU 11, a memory 12, a host interface (I/F) 13, a drive interface 14, and an internal communication interface 15.

The host interface 13 is an interface for exchanging data with the host computer 3. The drive interface 14 is an interface for exchanging data with a drive 31 in the drive enclosure 30A. The internal communication interface 15 is an interface for communicating with other controllers.

The memory 12 stores therein data to be transmitted to and received from the host computer 3, and control data for controlling the storage subsystem 1. The data transmitted to and received from the host computer 3 includes an input/output (I/O) request and host data from the host computer 3. The CPU 11 operates in accordance with a computer program stored in the memory 12, and executes processing of I/Os from the host computer 3 and processing required in maintaining and managing data in the storage subsystem 1.

The host interface 13 is a device for communicating with a host, and is connected to the CPU 11 via a standard bus such as PCI express. The host interface 13 performs network protocol conversion such as those for FC and Ethernet, and communicates with the host.

The drive interface 14 is a device for communicating with a drive 31 in the drive enclosure 30A, and is connected via a standard bus such as PCI express, in the same manner as the host interface 13. The drive interface 14 performs protocol conversion such as those for SAS or SATA, and communicates with the drive 31.

The memory 12 is a main storage device. The memory 12 is a device including a volatile element such as a DRAM, and is connected to the CPU 11 and transfers data via a memory interface (not illustrated), such as a double data rate (DDR) interface. The memory 12 is used for temporarily storing therein control data for controlling the storage subsystem 1, and host data received from the host. The memory 12 may also include a nonvolatile element such as a PRAM or an STT-RAM.

The internal communication interface 15 is an interface for establishing communication between controllers. For example, each of the controller 10A and the controller 10B connects the internal communication interface 15 corresponding thereto to that of the other via the internal communication network 20 to transfer data between nodes, and, in this manner, redundancy of the storage subsystem 1 can be ensured. As a result, it is possible to improve the availability when a failure occurs.

The internal communication interface 15 is typically connected via a bus such as PCI Express, but may be implemented as a network adapter such as Infini Band or Ethernet connected using PCI Express.

The CPU 11 is a processor that controls the operations of the storage subsystem 1, and controls the devices connected over the PCI express, such as the host interface 13 and the drive interface 14. In addition to a core that operates in accordance with a computer program and a DMA that performs the data transfer, the CPU 11 may be equipped with a PCIe interface for establishing a connection with a PCIe device over the PCI express, and with a main storage interface that controls the elements included in the memory 12. Circuits for implementing these functions are connected to one another by a switch internal of the CPU 11.

Each of the components making up the controller 10 may be provided in any number. For example, each of the controllers 10 may include a plurality of CPUs 11, a plurality of memories 12, a plurality of host interfaces 13, a plurality of drive interfaces 14, and a plurality of internal communication interfaces 15.

Figure 2:
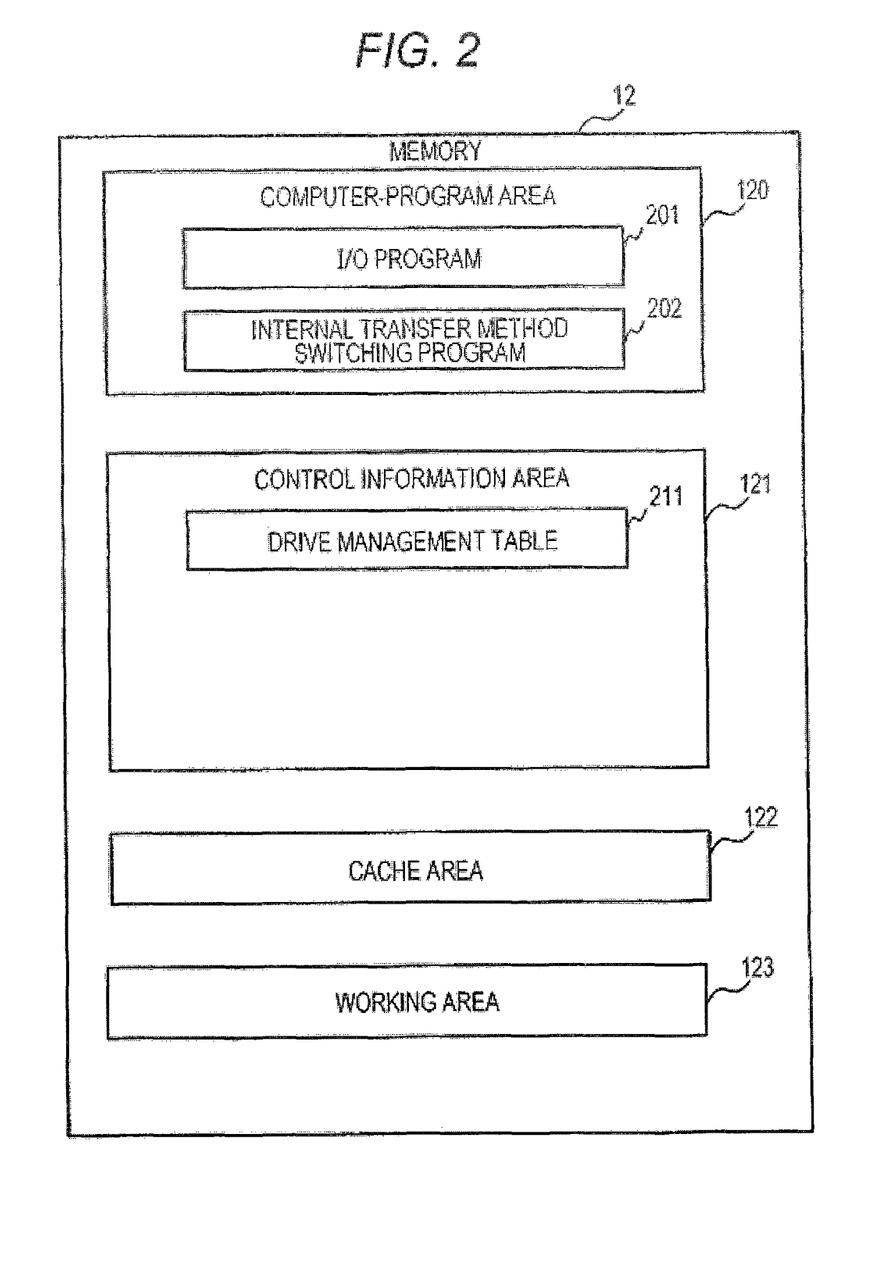
FIG. 2 is a diagram illustrating a configuration example of a memory in the storage subsystem.

FIG. 2 illustrates areas included in the memory 12. The memory 12 includes a computer-program area 120, a control information area 121, a cache area 122, and a working area 123. The computer-program area 120 stores therein a computer program for causing the CPU 11 to execute processing that is necessary for operating the storage subsystem 1. FIG. 2 includes, as an example, an I/O program 201 and an internal transfer method switching program 202. In addition to these computer programs, the computer program may also include an operating system, for example.

The control information area 121 stores therein various types of information referred to and managed by the CPU 11, in order to put the storage subsystem 1 in operation. FIG. 2 illustrates the drive management table 211 as an example. The drive management table 211 is shared among the controllers. The control information area 121 further stores therein a part or the whole of the logical-physical management table 312 illustrated in FIG. 3. The cache area 122 stores therein host data to be transmitted to and received from the host computer, in order to improve the performance by taking advantage of a cache hit.

The working area 123 is a temporary area for the CPU 11 to perform processing, such as data transfer, or addition or removal of the control data, to the entire data including the host data and the control data. The data the processing of which is completed is deleted from the working area 123.

Figure 3:
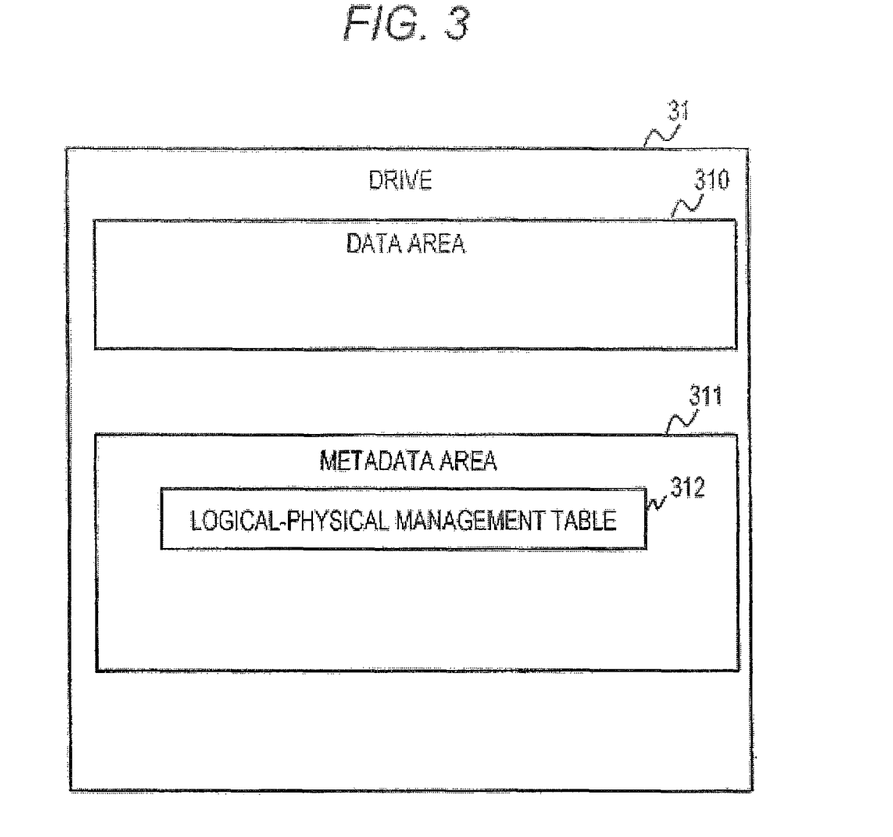
FIG. 3 is a diagram illustrating a configuration example of a drive.

FIG. 3 illustrates areas included in the drive 31. The drive 31 includes a data area 310 and a metadata area 311. The data area 310 stores therein host data received from the host computer 3. As will be explained later, compressed or not-compressed host data is stored in the data area 310.

The metadata area 311 stores therein control data that is used by the controller belonging to the same node, the control data being required to execute processing in the storage subsystem 1. FIG. 3 illustrates the logical-physical management table 312 as an example of the control data. The logical-physical management table 312 manages mapping information between the logical address space accessed by the host computer 3 and the physical address space where the host data is stored. The logical-physical management table 312 is shared among the controllers. The logical-physical management table 312 will be explained later in detail.

Figure 4:
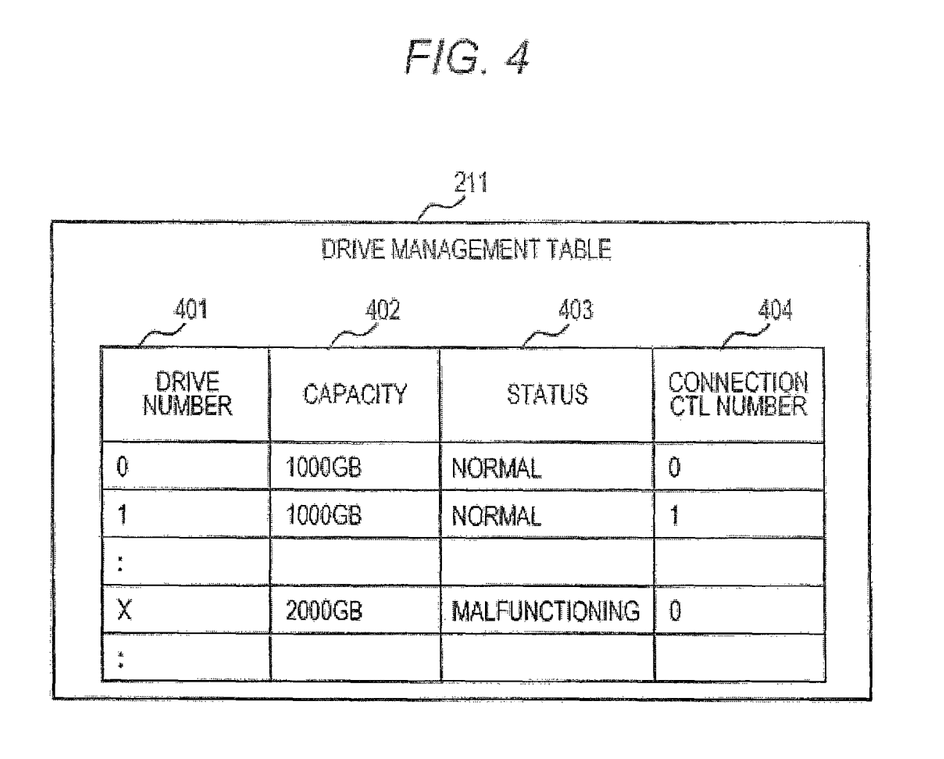
FIG. 4 is a diagram illustrating a configuration example of a drive management table.

FIG. 4 illustrates a configuration example of the drive management table 211. The drive management table 211 manages a plurality of drives 31 mounted on the storage subsystem 1. In the example illustrated in FIG. 4, all of the controllers in the subsystem 1 maintain a common drive management table 211.

The drive management table 211 includes a drive number field 401, a capacity field 402, a status field 403, and a connected controller number field 404. The drive number field 401 indicates a number (identifier) by which the corresponding drive 31 is identified as a match, in the storage subsystem 1. The capacity field 402 indicates the capacity of the corresponding drive 31.

The status field 403 indicates the status of the corresponding drive 31. Specifically, this field indicates that the corresponding drive 31 is normal or malfunctioning. The connected controller number field 404 indicates the number assigned to the controller 10 that is connected to and capable of accessing the corresponding drive 31 directly. The controller number is an identifier for uniquely identifying the controller 10 in the storage subsystem 1.

Figure 5:
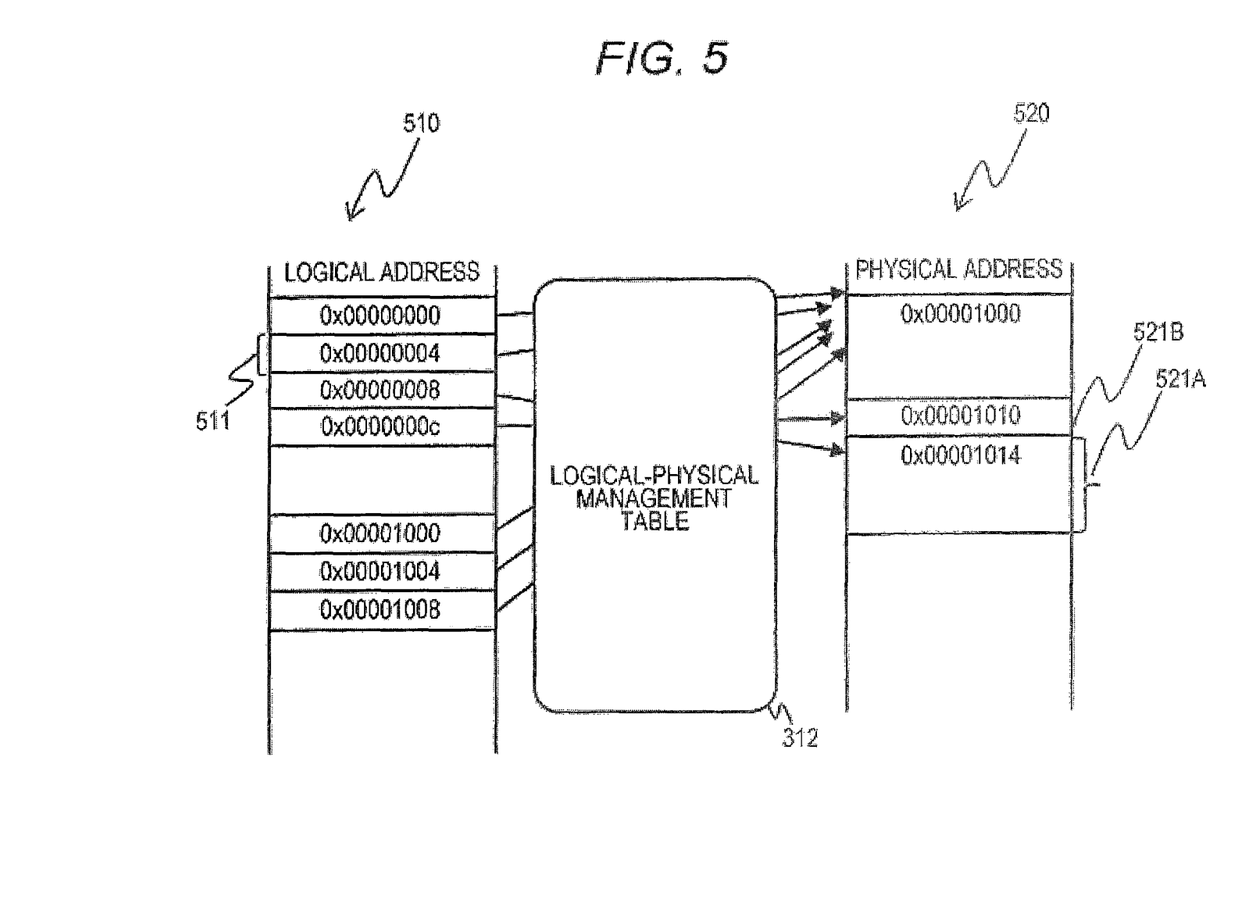
FIG. 5 is a schematic diagram of logical-physical management.

FIG. 5 is a diagram for explaining the address spaces managed in the storage subsystem 1. In the example illustrated in FIG. 5, a logical address space 510 and a physical address space 520 are managed. The logical address space 510 is the address space for a logical volume (LUN) accessed by the host computer 3. A logical address space 510 may be defined for each of a plurality of logical volumes.

The physical address space 520 is an address space in the drive 31. It is assumed herein that the storage areas in all of the drives 31 in the storage subsystem 1 are mapped to the physical address space 520. In another example, a plurality of drives 31 in the same drive enclosure 30 may together form a RAID group. A physical address space may be configured for each of such a RAID group.

To facilitate explanations of the characteristics of the present application, FIG. 5 illustrates two address spaces as an example. In another configuration example, the host data in the storage subsystem 1 may be processed and managed in a hierarchical structure that includes a larger number of address spaces. For example, a logical address space for managing compressed data may be defined between the logical address space 510 and the physical address space 520.

As illustrated in FIG. 5, the logical-physical management table 312 manages a relationship (address mapping) between an address in the logical address space 510 and an address in the physical address space 520. An address in the logical address space 510 is managed in units of a logical chunk. A logical chunk 511 is a unit of the area having a specific size, and the size is 4 KB, for example. The host computer 3 designates one or more logical chunks 511, and requests reading or writing of host data.

Each of the logical chunks 511 is assigned with a unique address in the logical address space 510. This address is referred to as a logical address. FIG. 5 illustrates logical addresses of the respective logical chunks 511. In the example of FIG. 5, a logical address points to an address at the beginning of the corresponding logical chunk 511, and an increment from the address corresponds to the size of the logical chunk 511. The data stored in a logical chunk 511 is sometimes referred to as logical chunk data or a data chunk.

The controller 10 compresses the host data corresponding to a plurality of logical chunks 511 all together to generate a piece of compressed data. As a result, a high compression ratio can be achieved, and the storage cost can be reduced. The compressed data is stored in the drive 31. The data size of the compressed data is not constant. Because the physical address space 520 stores therein compressed data, it is possible to store variable-length data.

A unit obtained by compressing a plurality of logical chunks is referred to as a physical chunk. In FIG. 5, reference numerals 521A and 521B indicates two physical chunks, as an example. Hereinafter, a physical chunk 521 means any one of the physical chunks. The physical chunk 521 is a part of the area in the physical address space 520, and is identified by an address in the physical address space 520. This address is referred to as a physical address. In the example of FIG. 5, the physical address points to the address at the beginning of the physical chunk 521. The data stored in the physical chunk 521 may be referred to as physical chunk data or a data chunk.

The host data may be stored in the drive 31 without being compressed. Such not-compressed data is stored in one physical chunk 521. In the configuration example of FIG. 5, the physical chunk 521A stores therein data obtained by compressing data of a plurality of logical chunks 511. The physical chunk 521B stores therein not-compressed data corresponding to one logical chunk 511.

As explained above, one physical chunk 521 is associated with one or more logical chunks 511. One physical chunk 521 may be associated with a plurality of consecutive logical chunks 511, or may be associated with a plurality of dispersed logical chunks 511.

In one embodiment herein, the number of logical chunks 511 the data of which is to be compressed is constant. For example, the data in eight logical chunks 511 is compressed to achieve a piece of physical chunk data. In other words, a physical chunk 521 contains not-compressed data corresponding to one logical chunk 511, or compressed data corresponding to eight logical chunks 511. When the size of the logical chunk 511 is 4 KB, the physical chunk 521 has a size of either 4 KB or 32 KB.

By integrating a large number of logical chunks into one, it is possible to improve the data reduction ratio. A plurality of logical chunks, e.g., a certain number of logical chunks, that is, four or more logical chunks, may be compressed into one physical chunk, for example. In this manner, the compression ratio can be improved. Note that the number of logical chunks the data of which is to be compressed does not need to be constant.

Figure 6:
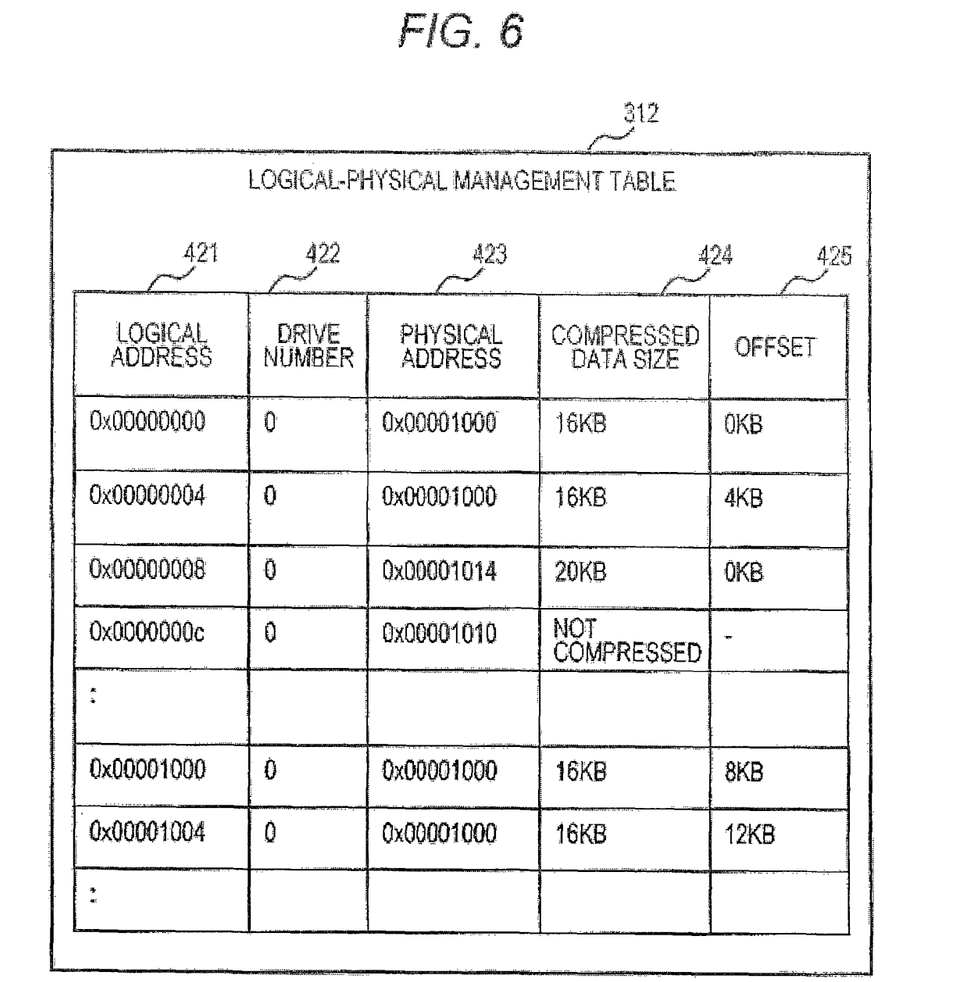
FIG. 6 is a diagram illustrating a configuration example of a logical-physical management table.

FIG. 6 illustrates a configuration example of the logical-physical management table 312. The logical-physical management table 312 manages mapping between addresses in the logical address space 510 and the physical address space 520. In the configuration example of FIG. 6, the logical-physical management table 312 includes a logical address field 421, a drive number field 422, a physical address field 423, a size-after-compression field 424, and an offset field 425.

The logical address field 421 specifies the logical address of a logical chunk 511. The drive number field 422 specifies the drive number of the drive providing a storage area allocated to the logical chunk specified by the corresponding logical address. The physical address field 423 specifies the physical address of a physical chunk, allocated to the logical chunk designated by the corresponding logical address.

The size-after-compression field 424 indicates the data size of the compressed data that contains the logical chunk data. As explained above, a piece of compressed data is generated from a plurality of pieces of logical chunk data, and a piece of logical chunk data makes up a part of a piece of compressed data. Note that the size-after-compression field 424 indicates "not-compressed", for a logical chunk stored in a not-compressed format in the drive 31. The offset field 425 indicates an offset of the logical chunk data in the original data of the compressed data, that is, offset in the data resultant of decompressing the compressed data.

The host I/O processing will now be explained. In the host I/O processing, the controller 10 compresses or decompresses host data. In other words, in host-writing processing, the controller 10 compresses the host data received from the host computer 3, and stores the compressed host data in the drive 31. In host-reading processing, the controller 10 decompresses the compressed data read from the drive 31, and returns the resultant data to the host computer 3.

More specifically, in the host-writing processing, the CPU 11 stores a piece of host data received from the host computer 3 in the cache area 122, and returns a completion response to the host computer. The CPU 11 then compresses 4 KB×8=32 KB worth of pieces of logical chunk data on the working area 123, in the order in which the pieces of logical chunk data are written, and stores the compressed data in the drive 31. Although not illustrated, in order to achieve a higher compression rate, compression may be performed using a dedicated accelerator, such as a field programmable gate array (FPGA).

After the compression, the CPU 11 determines whether the compression has been effective. For example, when the data size of the compressed data is smaller than a threshold, the CPU 11 stores the original host data without the compression in the drive 31.

In the host-reading processing, the CPU 11 reads the compressed data that contains the logical chunk data designated by the read request, from the drive 31 to the working area 123 of the memory 12. After performing the decompression process in the working area 123, the CPU 11 reads the logical chunk data at the offset position designated in the logical-physical management table 312, and transfers the logical chunk data to the host computer 3.

In addition to the CPU 11, the controller 10 may also include an accelerator for compressing and decompressing data. By compressing and decompressing host data with an accelerator, the load of the CPU 11 can be reduced.

In a storage subsystem including a plurality of nodes, as the storage subsystem 1 according to the embodiment of the present specification, data transfer between nodes may take place either in host-writing processing or in the host-reading processing.

As illustrated in FIG. 1, each of the controllers 10 has an independent host interface 13. Each of the controllers 10 individually receives an I/O request from the host computer 3. Upon receiving an I/O request from a host computer, the controller 10 returns a completion response to the host computer 3. In the host-reading processing, the controller 10 having received the I/O request transfers the host data to the host computer 3 via the network 2.

In addition, in the storage subsystem 1 according to the embodiment of the present specification, each of the nodes 40 includes an independent drive 31. To read data from a drive 31 on a node that is not the node where the controller 10 resides, the controllers 10 transmits a request to another controller 10 connected to the drive 31. The other controller 10 having received the request reads the data from the drive 31 temporarily onto the memory 12, and then transfers the data to the controller 10 on the requester node 40.

Transfer of data between nodes increases the load of the storage subsystem 1. In data transfer between the nodes, the storage subsystem 1 according to the embodiment of the present specification selects a node where the processing of decompressing compressed data is to be performed, from the source and the destination from and to which the data is transferred, based on a preset condition. In this manner, it is possible to improve the throughput of the storage subsystem 1.

In one embodiment of the present specification, the controller 10 determines which controller 10 is to execute the decompression processing based on the size of the compressed data (physical chunk data) read from the drive 31, and the size of the host data after the decompression (logical chunk data) requested from the host computer 3. In this manner, it is possible to improve the throughput performance more effectively.

To begin with, the host-writing processing will be explained. The controller 10 receives a write request from the host computer 3. A write request contains an identifier of the logical volume that is the destination for storing therein data to be written, and the logical address at which the data is written, and a data length.

The CPU 11 executes the I/O program 201. The I/O program 201 stores the host data received from the host computer 3 in the cache area 122, and returns a completion response. In this example, the host computer 3 transmits the host data in units of 4 KB.

When the cache data for the logical volume reaches a predetermined size, e.g., 32 KB in this example, the I/O program 201 compresses the 32-KB host data in the working area 123 to generate a piece of compressed data. The I/O program 201 then compares the size of the data after compression with a threshold.

If the size of the data after compression is equal to or smaller than the threshold, and if the drive 31 on the same node 40 is normal and has a capacity available for storing the compressed data, the I/O program 201 stores the compressed data in the drive 31 on the same node 40, and updates the logical-physical management table 312. By contrast, if the drive 31 on the same node 40 is not normal or does not have a sufficient capacity available for storing the compressed data, the compressed data is stored in the drive 31 on another node 40 in the storage subsystem 1. Updates of the logical-physical management table 312 are shared among the controllers. The compressed data generated from data of eight logical chunks 511 is stored in one physical chunk 521.

If the size of the data after compression is larger than the threshold, the I/O program 201 stores the not-compressed data, which is being stored in the cache area, 122 in the drive 31, and updates the logical-physical management table 312. One physical chunk 521 stores therein data corresponding to one logical chunk 511 of 4 KB.

As a method for selecting the node 40 for which the compressed data is to be stored in the drive 31 in the storage subsystem 1, the node 40 may be switched every time the compressed data is to be stored, so that the drive capacity on each node is consumed evenly. In this case, for example, the destination node where the data is to be stored is determined by the remainder of a division of a hash value of the compressed data by the number of nodes in the storage subsystem 1.

Figure 7:
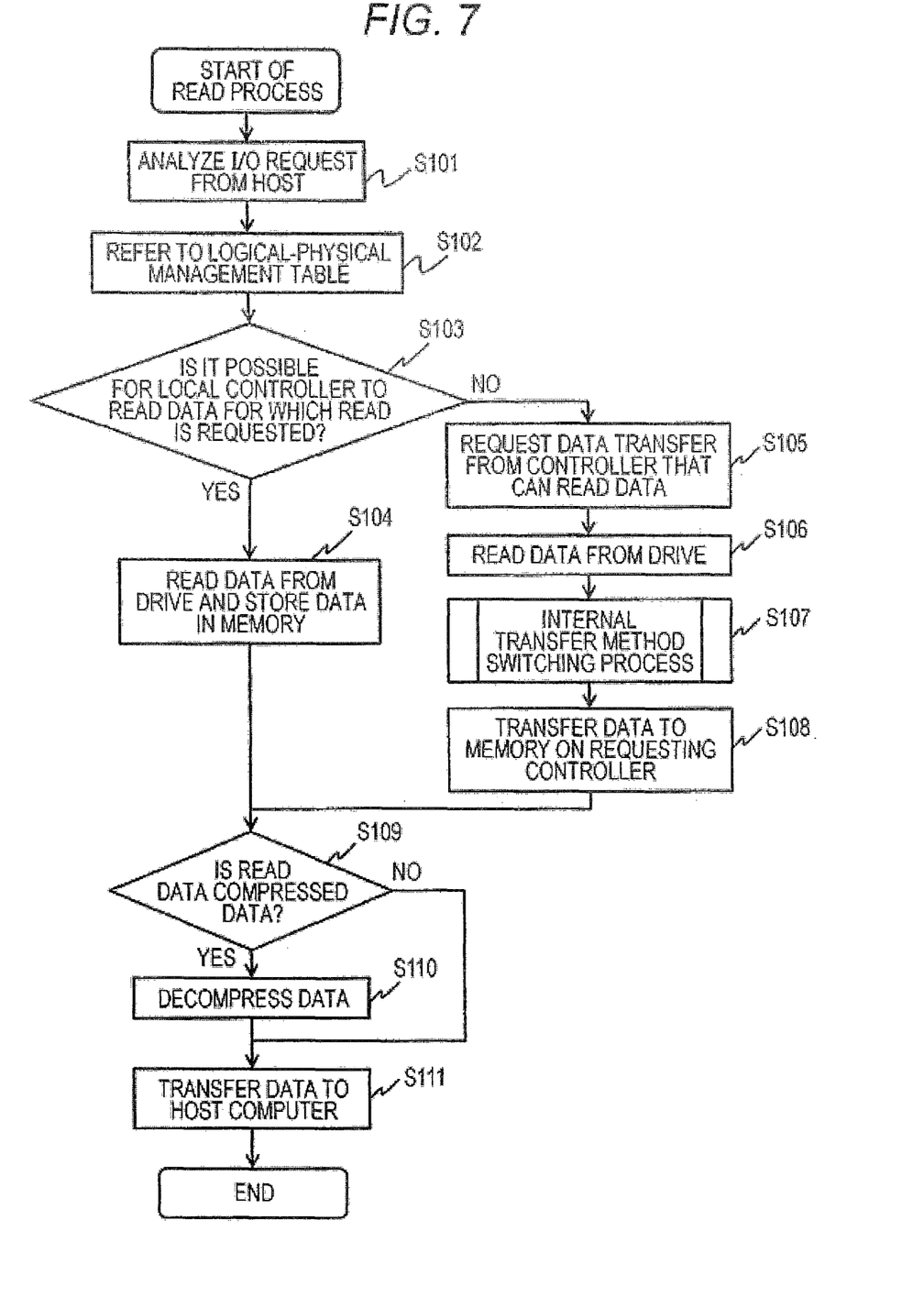
FIG. 7 is a flowchart of an example of read I/O processing.

The host-reading processing will now be explained. FIG. 7 is a flowchart of an example of the host-reading processing. The controller 10 receives a read request from the host computer 3. The CPU 11 in the controller 10 executes the I/O program 201. The I/O program 201 analyzes the I/O request received from the host computer 3, that is, the read request in this example (S101). The read request specifies a piece of data to be read by the request, and, specifically, specifies the identifier of the destination logical volume to be accessed, and a start logical address and the data length of the data being requested. In other words, a read request designates one or more logical chunks storing therein the data to be transferred.

The I/O program 201 then refers to the logical-physical management table 312, and identifies the drive number and the physical address of the physical chunk corresponding to each of the designated logical chunks (S102).

The I/O program 201 then determines whether the data corresponding to each of such logical chunks can be read directly via the local controller 10 (S103). Specifically, the I/O program 201 refers to the drive management table 211 and acquires the connected controller number of the drive number to which the logical chunk is mapped. If the connected controller number is the number of the local controller, the data in the requested logical chunk (physical chunk data corresponding to the requested logical chunk) can be directly read via the local controller 10.

If the data of the logical chunk specified in the read request can be read via the local controller 10 (S103: YES), the I/O program 201 reads the host data from the drive 31 on the local node 40, and stores the host data in the cache area 122 in the memory 12 (S104). Specifically, the I/O program 201 reads the host data from the physical address acquired from the logical-physical management table 312. This enables the processing to be performed rapidly and efficiently.

If the logical chunk data specified in the read request cannot be directly read via the local controller 10 (S103: NO), the I/O program 201 requests transfer of the host data from the controller 10 capable of directly reading the host data from its drive 31 (S105).

Specifically, the I/O program 201 refers to the drive management table 211, acquires the connected controller number corresponding to the drive to be accessed, from the connected controller number field 404, and transmits a request specifying the logical address to the controller specifying by the controller number of the controller to be connected.

The I/O program 201 of the controller 10 having received the request from the other controller 10 reads the requested host data from the drive 31 connected in the local node 40, onto the cache area 122 of the local controller 10 (S106). Specifically, the I/O program 201 acquires the physical address associated with the designated logical address from the logical-physical management table 312, reads the host data at the physical address from the drive 31, and stores the host data in the working area 123 of the memory 12.

Figure 8:
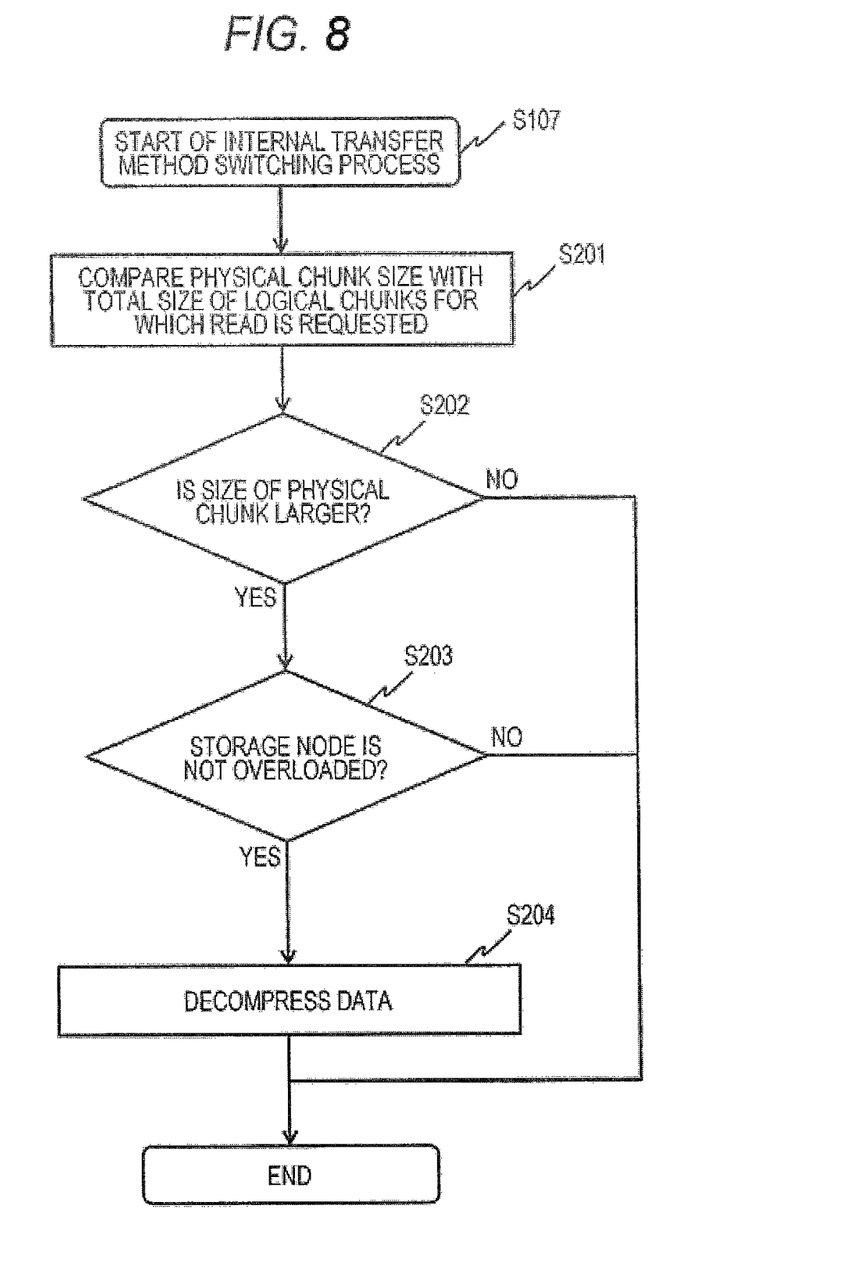
FIG. 8 is a flowchart of an example of internal transfer method switching processing.

The CPU 11 then executes an internal transfer method switching process (S107). FIG. 8 is a flowchart illustrating an example of the internal transfer method switching process S107. The internal transfer method switching process is executed by the internal transfer method switching program 202.

The internal transfer method switching program 202 compares the size of one physical chunk read from the drive 31 with the sum of the sizes of one or more logical chunks associated with the physical chunk specified in the request received from the other controller 10 (S201). In other words, the size of the compressed data read from one physical chunk is compared with the size of the host data requested by the host computer 3, the requested host data included in the data obtained by decompressing the compressed data. The information about the size of the physical chunk can be obtained from the size-after-compression field 424 in the logical-physical management table 312.

If the physical chunk size is larger than the total size of the requested logical chunks (S202: YES) and if the storage node is not overloaded (S203: YES), the internal transfer method switching program 202 decompresses the compressed data on the working area 123 (S204). If the physical chunk size is equal to or smaller than the total size of the requested logical chunks (S202: NO), the decompression process S203 is skipped and this process is ended. If the physical chunk data is not-compressed data, because the physical chunk size and the logical chunk total size are the same, the decompression processing is skipped.

A condition for determining that the storage node is overloaded is, for example, that the utilization rate of the CPU 11 exceeds a threshold, and there is a concern that, if the decompression processing is performed on the node, the storage node would become overloaded and become a performance bottleneck. In addition, in a configuration in which an accelerator circuit such as an FPGA dedicated to the decompression processing is used, it is determined that the storage node is overloaded if the utilization rate of the FPGA is equal to or higher than a threshold.

Referring back to FIG. 7, subsequently to the internal transfer method switching process S107, the I/O program 201 in the other controller 10 transfers the compressed or decompressed data for which the read has been requested, to a predetermined area of the memory 12 in the requesting controller 10 (S108). When the decompression processing has been executed, data corresponding to the requested logical chunks is selected from the entire decompressed data, and transferred.

The I/O program 201 in the controller 10 having received the read request from the host computer 3 then determines whether the data read from the drive 31 is compressed data or not-compressed data (S109). If the data has been read from the drive 31 by the local controller 10, the I/O program 201 can determine whether the data is compressed or not-compressed by referring to the size-after-compression field 424 in the logical-physical management table 312.

When the data the read of which is requested has been transferred from another controller 10, compressed/not-compressed information may be appended to the transferred data for which the read is requested, for example. In another example, the I/O program 201 in the other controller 10 may transmit the compressed/not-compressed information to the requesting controller 10 separately from the transferred data for which the read is requested. By notifying the requesting controller 10 of the compressed/not-compressed information, the efficiency of the subsequent processing of the requesting controller 10 is improved.

If the read data is compressed data (S109: YES), the I/O program 201 decompresses the compressed data in the working area 113 (S110), and transfers the decompressed host data to the host computer 3 (S111). If the read data is not-compressed data (S109: NO), the I/O program 201 transfers the host data to the host computer 3 (S111).

As explained above, when the unit of the compressed data (physical chunk size) is larger than the I/O length (total logical chunk size) requested from the host computer 3, the data the reading of which is requested is decompressed in the node having been storing therein the data. As a result, it is possible to reduce the amount of transferred data, and to suppress performance degradation due to the internal communication network 20 becoming a bottleneck. The embodiment of the present specification can achieve a high compression ratio by compressing multiple logical chunks together, and a high throughput by improving the data transfer between the nodes. In particular, when the host I/O length is smaller than the unit of compression and the compression reduction ratio is lower, better performance improvement effect can be achieved.

Different criteria may be used to select the controller for executing the processing of decompressing the compressed data, being different from the example explained with reference to FIG. 8. In addition to the condition related to the data size before and after decompression, another additional condition may be used. It is also possible to define another determination criteria related to the data size. For example, the decompression processing may be executed if the physical chunk size is larger than a value obtained by adding a predetermined value to the total logical chunk size. When the plurality of drives 31 in each node constitute a RAID group, the storage where data is stored may be managed in units of a RAID group.

Note that the present invention is not limited to the above-explained embodiment, and includes various modifications thereof. For example, because the embodiment has been explained above in detail to facilitate understanding of the present invention, the present invention is not necessarily limited to the configuration including all of the elements explained above. Furthermore, a part of the configuration according to one embodiment can be replaced with a configuration according to another embodiment, and a configuration according to another embodiment may be added to the configuration of the one embodiment. In addition, another configuration may be added to, deleted from, and replaced with a part of the configuration according to each of the embodiments.

In addition, some or all of the configurations, functions, and the like explained above may be implemented as hardware, through designing of an integrated circuit, for example. In addition, each of the configurations, functions, and the like explained above may be implemented as software by causing a processor to parse and to execute a computer program for implementing the corresponding function. Information such as a computer program, a table, and a file for implementing each of the functions may be stored in a recording device such as a memory, a hard disk, and a solid state drive (SSD), or a recording medium such as an IC card, and an SD card.

In addition, control lines and information lines presented are those considered to be necessary for the explanation, and are not necessarily the representations of all of the control lines and the information lines in the product. In reality, it is possible to consider that almost all of the configurations are connected to one another.

What is claimed is:

1. A storage system comprising a plurality of nodes, wherein
the plurality of nodes include a first node and a second node,
the first node is configured:
to receive a read request;
to determine a storage drive location where data corresponding to one or more logical addresses designated in the read request is stored; and
to request transfer of the data at the one or more logical addresses, from the second node, when the storage drive location is the second node, and
the second node is configured:
to read a data chunk containing data designated by the one or more logical addresses, from one or more storage drives;
to determine whether the data chunk is to be decompressed based on a size of the data chunk and a size of the one or more logical addresses; and
to decompress the data chunk based on a determination that the data chunk is to be decompressed, to extract the data at the one or more logical addresses, and to transfer the extracted data to the first node.

2. The storage system according to claim 1, wherein the second node is configured to determine to decompress the data chunk when the size of the data chunk is larger than the size of the one or more logical addresses.

3. The storage system according to claim 1, wherein
when the data chunk is compressed data containing data designated by a plurality of logical addresses, and the determination that the data chunk is not to be decompressed is made, the second node is configured to transfer the compressed data to the first node, and
the first node is configured to decompress the compressed data.

4. The storage system according to claim 1, wherein
the second node is configured to transmit information indicating whether the transferred data is compressed or not-compressed, to the first node, and
the first node is configured to determine whether the transferred data from the second node is to be decompressed, based on the information.

5. The storage system according to claim 1, wherein
the first node is configured:
to read a data chunk containing data designated by the one or more logical addresses, from one or more storage drives on the first node, when the storage drive location is the first node; and
when the data chunk is compressed data, to decompress the compressed data and to transfer the data designated by the one or more logical addresses to a requestor having issued the read request.

6. The storage system according to claim 1, wherein
the one or more logical addresses are configured to designate an area unit having a constant size, and
each node of the plurality of nodes is configured to compress a constant number of area units equal to or more than four into a piece of compressed data, and stores the piece of compressed data in the storage drive.

7. A data transfer method in a storage system that includes a plurality of nodes including a first node and a second node, and the data transfer method comprising:
causing the first node to receive a read request;
causing the first node to determine a storage drive location where data corresponding to one or more logical addresses designated in the read request is stored;
causing the first node to request transfer of data at the one or more logical addresses, from the second node, when the storage drive location is the second node;
causing the second node to read a data chunk containing data designated by the one or more logical addresses, from one or more storage drives;
causing the second node to determine whether the data chunk is to be decompressed based on a size of the data chunk and a size of the one or more logical addresses; and
causing the second node to decompress the data chunk based on a determination that the data chunk is to be decompressed, to extract the data at the one or more logical addresses, and to transfer the extracted data to the first node.

\* \* \* \* \*